United States Patent
Song et al.

(10) Patent No.: US 10,181,091 B2
(45) Date of Patent: Jan. 15, 2019

(54) FINE-GRAINED IMAGE SIMILARITY

(71) Applicant: Google LLC, Mountain View, CA (US)

(72) Inventors: Yang Song, Mountain View, CA (US); Jiang Wang, Mountain View, CA (US); Charles J. Rosenberg, Mountain View, CA (US)

(73) Assignee: Google LLC, Mountain View, CA (US)

( * ) Notice: Subject to any disclaimer, the term of this patent is extended or adjusted under 35 U.S.C. 154(b) by 197 days.

(21) Appl. No.: 15/504,870

(22) PCT Filed: Jun. 19, 2015

(86) PCT No.: PCT/US2015/036740
§ 371 (c)(1),
(2) Date: Feb. 17, 2017

(87) PCT Pub. No.: WO2015/196102
PCT Pub. Date: Dec. 23, 2015

(65) Prior Publication Data
US 2017/0243082 A1      Aug. 24, 2017

Related U.S. Application Data

(60) Provisional application No. 62/015,107, filed on Jun. 20, 2014.

(51) Int. Cl.
*G06K 9/00* (2006.01)
*G06K 9/62* (2006.01)
(Continued)

(52) U.S. Cl.
CPC ....... *G06K 9/6215* (2013.01); *G06F 17/3028* (2013.01); *G06F 17/30256* (2013.01);
(Continued)

(58) Field of Classification Search
CPC .... G06K 9/6215; G06K 9/6212; G06K 9/627; G06K 9/66; G06F 17/30256; G06F 17/3028; G06N 3/0454; G06N 99/005
See application file for complete search history.

(56) References Cited

U.S. PATENT DOCUMENTS 8,712,156 B2 *   4/2014  Bronstein ............ G06K 9/6289
                                                382/181
8,805,812 B1 *   8/2014  Chechik ............ G06F 17/30247
                                                707/705
(Continued)

OTHER PUBLICATIONS

Anonymous. "Learning Fine-grained Image Similarity with Deep Ranking," arXiv preprint arXiv 1404.4661, Apr. 17, 2014, 2 pages.
(Continued)

*Primary Examiner* — Gregory M Desire
(74) *Attorney, Agent, or Firm* — McDonnell Boehnen Hulbert & Berghoff LLP (57) ABSTRACT

Methods, systems, and apparatus, for determining fine-grained image similarity. In one aspect, a method includes training an image embedding function on image triplets by selecting image triplets of first, second and third images; generating, by the image embedding function, a first, second and third representations of the features of the first, second and third images; determining, based on the first representation of features and the second representation of features, a first similarity measure for the first image to the second image; determining, based on the first representation of features and the third representation of features, a second similarity measure for the first image to the third image; determining, based on the first and second similarity measures, a performance measure of the image embedding function for the image triplet; and adjusting the parameter weights of the image embedding function based on the performance measures for the image triplets.

20 Claims, 5 Drawing Sheets

(51) Int. Cl.
  *G06F 17/30* (2006.01)
  *G06K 9/66* (2006.01)
  *G06N 99/00* (2010.01)
  *G06N 3/04* (2006.01)

(52) U.S. Cl.
  CPC ........... *G06K 9/627* (2013.01); *G06K 9/6212* (2013.01); *G06K 9/66* (2013.01); *G06N 3/0454* (2013.01); *G06N 99/005* (2013.01)

(56) References Cited

U.S. PATENT DOCUMENTS

| | | | |
|---|---|---|---|
| 8,831,358 B1 | 9/2014 | Song et al. | |
| 9,424,492 B2* | 8/2016 | Murray | G06K 9/629 |
| 9,600,738 B2* | 3/2017 | Murray | G06K 9/6215 |
| 9,875,429 B2* | 1/2018 | Wang | G06K 9/6257 |
| 2013/0182909 A1* | 7/2013 | Rodriguez-Serrano | G06K 9/34 382/105 |
| 2015/0161485 A1* | 6/2015 | Chechik | G06F 17/30247 382/159 |
| 2017/0243082 A1* | 8/2017 | Song | G06F 17/30256 |

OTHER PUBLICATIONS

Anonymous "arXiv.org—Non-exclusive license to distribute," Jun. 21, 2007 1 page.
Berg, D. Jia, and L. FeiFei. Large scale visual recognition challenge 2012, Published in Int. J. of Comput. Vis. 115:211-252, 2015, 42 pages.
Boureau et al., "Learning Mid-Level Features for Recognition," 2010 IEEE Conference on Computer Vision and Pattern Recognition (CVPR), Jun. 13, 2010, 8 pages.
Chechik et al., "Large scale online learning of image similarity through ranking," The Journal of Machine Learning Research, 11, Mar. 10, 2010, 27 pages.
Dalal et al., "Histograms of Oriented Gradients for Human Detection" IEEE Computer Society Conference on Computer Vision and Pattern Recognition, vol. 1, Jun. 25, 2005, 8 pages.
Dean et al., "Large scale distributed deep networks," Advances in Neural Information Processing Systems 25, pages, 2012, 9 pages.
Deselaers and Ferrari, "Visual and semantic similarity in ImageNet," 2011 IEEE Conference on Computer Vision and Pattern Recognition (CVPR), Jun. 20, 2011, 8 pages.
Efraimidis, "Weighted random sampling over data streams," arXiv preprint arXiv:1012.0256v2, Jul. 28, 2015, 14 pages.
Farabet et al., "Learning hierarchical features for scene labeling," Pattern Analysis and Machine Intelligence, IEEE Transactions on, 35(8), Aug. 2013, 16 pages.
Frome et al., "Image retrieval and classification using local distance functions," In NIPS, vol. 2, Dec. 4, 2006, 8 pages.
Guillaumin et al., "TagProp: Discriminative metric learning in nearest neighbor models for image auto-annotation," Computer Vision, 2009 IEEE 12th International Conference on, Sep. 29, 2009, 9 pages.
Hadsell et al., "Dimensionality reduction by learning an invariant mapping," Computer Vision and Pattern Recognition, 2006 IEEE Computer Society Conference on, vol. 2, 2006, 8 pages.
Hinton et al., "Improving neural networks by preventing co-adaptation of feature detectors," arXiv preprint arXiv:1207.0580v, Jul. 3, 2012, 18 pages.
International Preliminary Report on Patentability in International Application No. PCT/US2015/036740, dated Dec. 20, 2016, 8 pages.
International Search Report and Written Opinion in International Application No. PCT/US2015/036740, dated Sep. 18, 2015, 11 pages.
Ioffe, "Improved Consistent Sampling, Weighted Minhash and L1 Sketching," Data Mining (ICDM), 2010 IEEE 10th International Conference on, pp. 246-255, Dec. 13, 2010, 10 pages.
Krizhevsky et al., "ImageNet classification with deep convolutional neural networks," In NIPS, 2012, 9 pages.
Lazebnik et al., "Beyond bags of features: Spatial pyramid matching for recognizing natural scene categories," Computer Vision and Pattern Recognition, 2006 IEEE Computer Society Conference on, vol. 2, Jun. 2006, 8 pages.
Lowe, "Object recognition from local scale-invariant features," Computer Vision, 1999. The Proceedings of the Seventh IEEE International Conference on, vol. 2, 1999, 8 pages.
Nesterov, "A method of solving a convex programming problem with convergence rate $O(1/k^2)$," Soviet Mathematics Doklady, vol. 27 (1983), 10 pages.
Parikh and Grauman, "Relative attributes," Computer Vision (ICCV), 2011 IEEE International Conference on, Nov. 2011, 8 pages.
Perronnin et al., "Large-scale image retrieval with compressed fisher vectors," Computer Vision and Pattern Recognition (CVPR), 2010 IEEE Conference on, Jun. 2010, 8 pages.
Sutskever et al., "On the importance of initialization and momentum in deep learning," Proceedings of the 30$^{th}$ International Conference on Machine Learning, May 2013, 9 pages.
Taylor et al., "Learning invariance through imitation," Computer Vision and Pattern Recognition (CVPR), 2011 IEEE Conference on, Jun. 2011, 8 pages.
Wang et al., "Learning Image Similarity from Flickr Groups Using Stochastic Intersection Kernel Machines," Computer Vision, 2009 IEEE 12th International Conference on, Sep. 2009, 8 pages.
Wang et al. "Learning Fine-Grained Image Similarity with Deep Ranking," arXiv preprint arXiv 1404.4661, Apr. 17, 2014, 8 pages.
Weston et al., "Large scale image annotation: learning to rank with joint word-image embeddings," Machine learning, 81(1) Oct. 2010, 16 pages.
Wu et al., "Online multimodal deep similarity learning with application to image retrieval," In Proceedings of the 21st ACM international conference on Multimedia, ACM, Oct. 2013, 10 pages.

* cited by examiner

FINE-GRAINED IMAGE SIMILARITY

CLAIM OF PRIORITY

This application claims priority under 35 USC § 119(e) to U.S. Patent Application Ser. No. 62/015,107, filed on Jun. 20, 2014, the entire contents of which are hereby incorporated by reference.

BACKGROUND

This specification relates to image processing.

The Internet provides access to a wide variety of resources such as video or audio files, web pages for particular subjects, book articles, or news articles. There are many resources available, and to help users find resources that may be of interest to them, many companies have developed search systems that identify resources in response to a query. For textual searches, search queries usually are terms and phrases. For image searches, such as search of still images and videos, the search queries can be images, or terms and phrases, or a combination of images, terms and phrases. A search system ranks the resources in response to the query and provides search results that link to the identified resources. The search results are typically ordered for viewing according to the rank.

When searching images, a search system may use a trained model function to identify images that are similar to a search query image. A variety of model functions can be used. Many of these trained models are optimized to identify images that belong to a same category.

SUMMARY

This specification describes technologies relating to image processing, and in particular training an image embedding function to distinguish differences and identify similarities between images that belong to a same category.

In general, one innovative aspect of the subject matter described in this specification can be embodied in methods that include the actions of iteratively training an image embedding function on image triplets, the embedding function comprising a set of parameter weights that operate on an input image to produce as output a representation of features of the image, each iteration of the training comprising: selecting image triplets, each image triplet being a combination of a first image, a second image and a third image, wherein a first pairwise relevance score that measures a similarity of the first image to the second image is greater than a second pairwise relevance score that measures the similarity of the first image to the third image; for each image triplet: providing each of the first, second and third images as input to the image embedding function, generating, by the image embedding function, a first representation of the features of the first image, a second representation of the features of the second image, and a third representation of the features of the third image, determining, based on the first representation of features and the second representation of features, a first similarity measure that measures a similarity of the first image to the second image, determining, based on the first representation of features and the third representation of features, a second similarity measure that measures a similarity of the first image to the third image, determining, based on the first and second similarity measures, a performance measure of the image embedding function for the image triplet; adjusting the parameter weights of the image embedding function based on the performance measures for the image triplets; and performing another iteration of the training until a cessation event occurs.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages and features. The systems and methods described below learn fine-grained image similarity to distinguish the differences between images belonging to the same category. The resulting image embedding function can incorporate both semantic and visual similarity features. To do so, a learned image embedding function considers both within-class images and between-class images. Within-class images are images that belong to the same class, and between-class images are images that belong to different classes. The system implements a sampling method and a training data generation method to generate a robust set of image triplets that include both within-class and between-class image sets. The multi-scale network structure can capture effectively the global visual appearance and image category information.

The incorporation of the semantic information is useful for distinguishing images from different classes, and the incorporation of visual information is useful for distinguishing images from the same class. The triplet sampling method makes it possible to provide large amounts of training data to learn the image embedding function.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
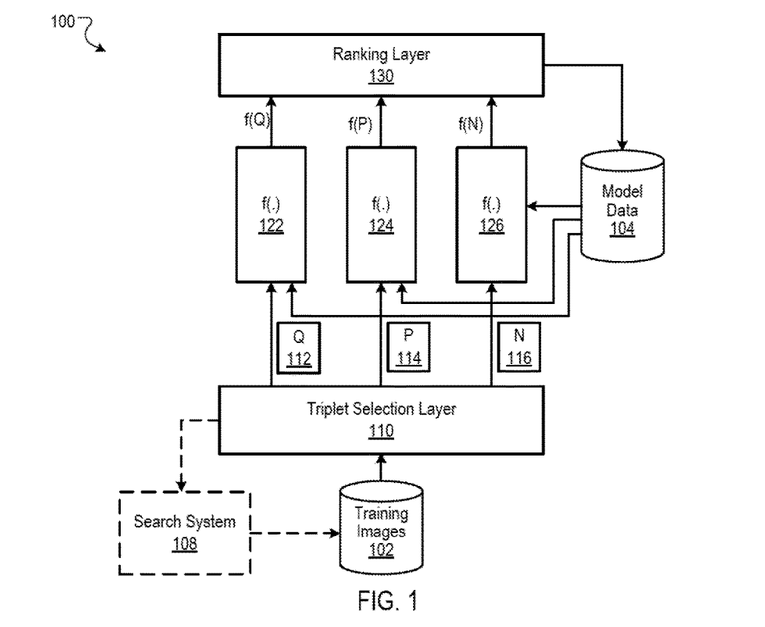
FIG. 1 is block diagram of a network architecture for learning an image embedding function based on image triplet training data.

FIG. 1 is block diagram of a system 100 for learning an image embedding function $f(\cdot)$ based on image triplet training data. The system 100 can be implemented in a data processing apparatus system of one or more networked computers.

The system 100 iteratively trains the image embedding function on image triplets selected from training images 102. The image embedding function is based on a set of parameter weights W that operate on an input image to produce as output a representation of features of the image. Data defining the image embedding function is stored in model data 104.

Figure 2:
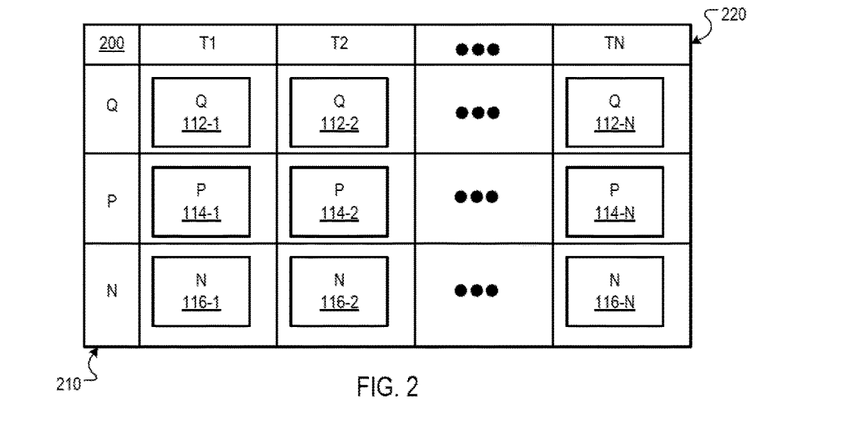
FIG. 2 is a table of image triplets.

Each image triplet is a combination of a first image 112, a second image 114 and a third image 116. The first image may be considered a "query" image Q, the second image may be considered a "positive" image P, while the third image may be considered a "negative" image N. FIG. 2 is a table 200 of image triplets, with rows 210 that correspond to the query image, positive image, and negative image. Each column 220 corresponds to an image triplet T such that $$T_k = \{Q_k, P_k, N_k\}$$

As will be described below, the system 100 uses the triplets to train an image embedding function that can, once trained, distinguish fine-grained image similarity of images within a same class.

Learning the Image Embedding Function

Figure 3:
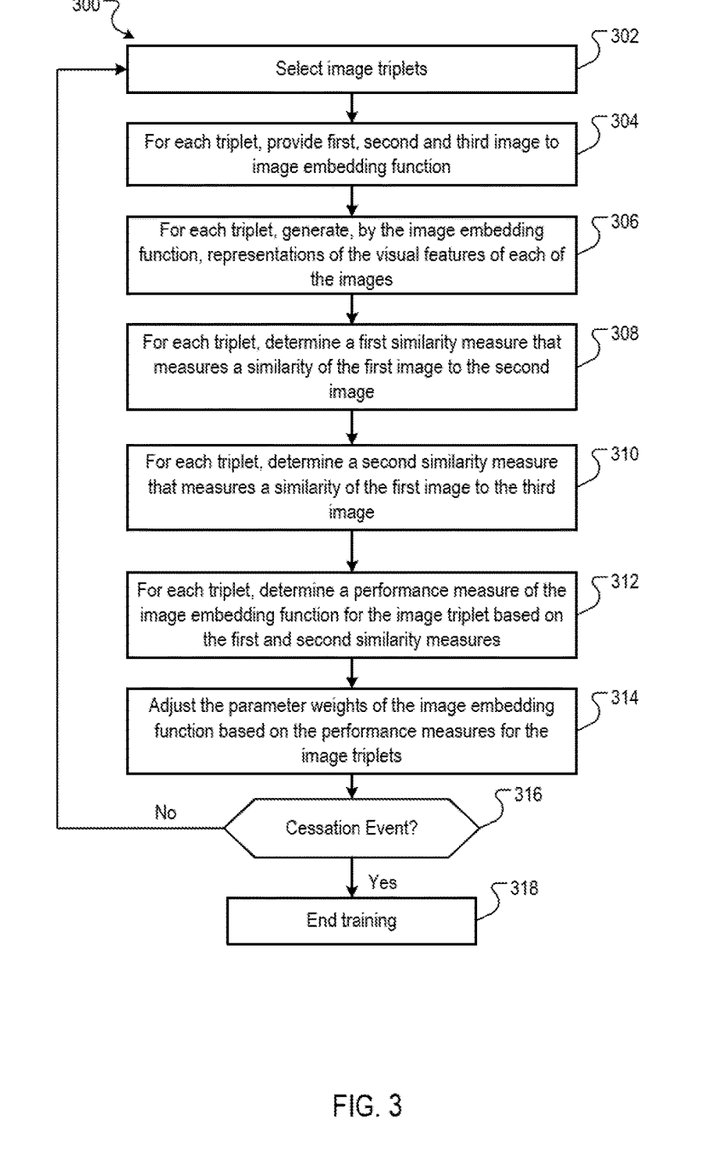
FIG. 3 is a flow diagram of an example process for learning the image embedding function based on image triplet training data.

Operation of the system 100 is described with reference to FIG. 3, which is a flow diagram of an example process 300 for learning the image embedding function based on image triplet training data. The process 300 can be implemented in a data processing apparatus system of one or more networked computers.

The process 300 is described in the context of a particular image embedding function that can determine a similarity of two images based on a distance metric. Furthermore, one example implementation of the image embedding function $f(\cdot)$ maps an image into a point in Euclidean space. However, other image embedding functions that generate other representations of images based on the image features and classification can also be used. Accordingly, any appropriate tunable function that can be iteratively trained by the process 300 can be used, and thus the image embedding function need not be the particular example function described below.

To begin an iteration the process 300 selects image triplets (302). For example, the triplet selection layer 110 selects the image triplets. The image triplets that are selected include the first, second and third images as described above. A first pairwise relevance score measures a similarity of the first image to the second image, and a second pairwise relevance score measures the similarity of the first image to the third image. The images in the triplet are selected such that the first image is more similar to the second image than it is to the third image. The relevance score may be expressed as $r_{i,j} = r(p_i, p_j)$, where both $p_i$ and $p_j$ belong to the same class.

Figure 5:
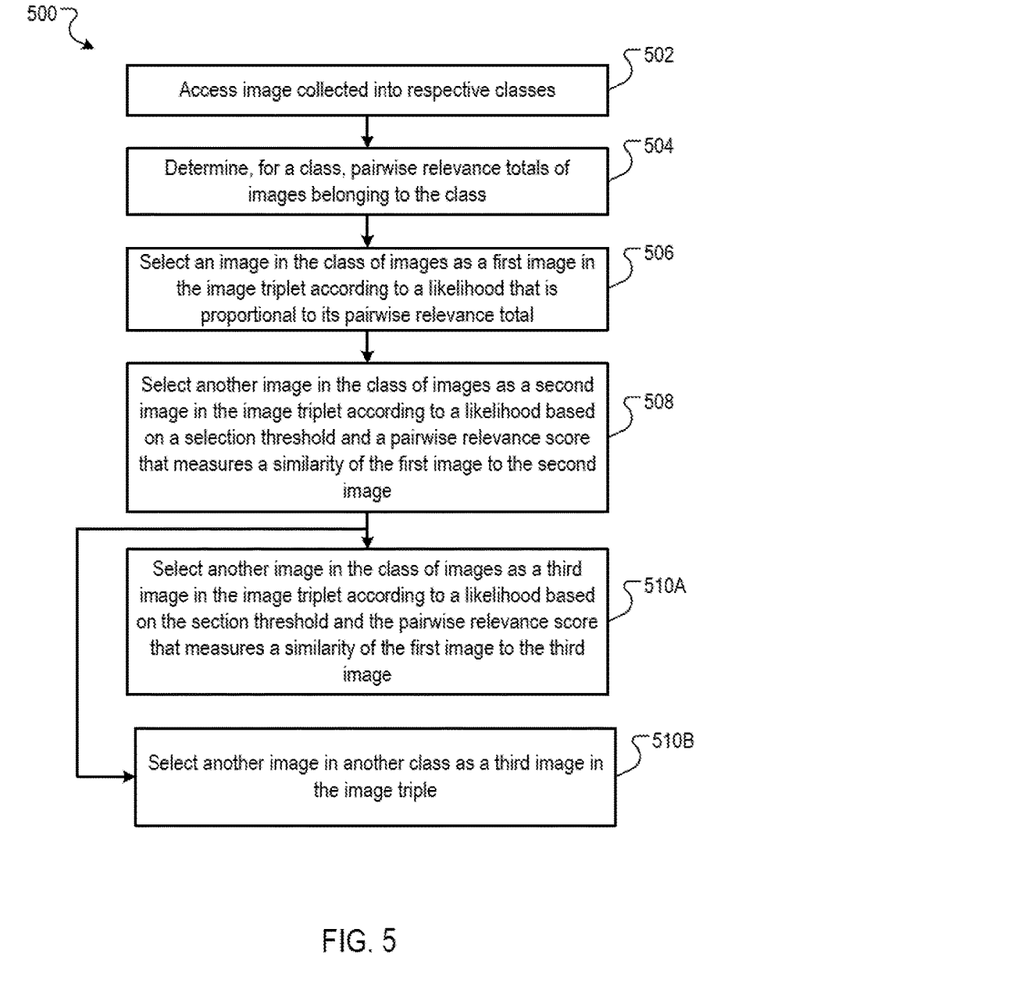
FIG. 5 is a flow diagram of an example process for generating image triplet training data.

Generation of image triplets is described with reference to FIG. 5 below.

For each triplet, the process 300 provides each of the first, second and third image as input to the image embedding function (304). For example, as shown in FIG. 1, the triplet selection layer 110 provides the first image 112, the second image 114 and the third image 116 to the image embedding function $f(\cdot)$ to generate instances $f(\cdot)$ 122, $f(\cdot)$ 124 and $f(\cdot)$ 126. Each instance uses the same embedding function $f(\cdot)$ but receives only one of the images in the image triplet as input.

For each triplet, the process 300 generates, by the image embedding function, representations of the visual features of each of the images (306). For example, as shown in FIG. 1, the representations $f(Q)$, $f(P)$, and $f(N)$ are generated. In some implementations, the embedding function generates a mapping of the image in Euclidean space as an output representation of features. However, other functions generating other representations can be used.

For each triplet, the process 300 determines a first similarity measure that measures a similarity of the first image to the second image (308), and a second similarity measure that measures a similarity of the first image to the third image (310). For example, the ranking layer 130 determines, based on the first representation of features $f(Q)$ and the second representation of features $f(P)$, a first similarity measure that measures a similarity of the first image to the second image. Likewise, the ranking layer 130 determines, based on the first representation of features $f(Q)$ and the third representation of features $f(N)$, a second similarity measure that measures a similarity of the first image to the third image.

In the case of the embedding function that maps an image into Euclidean space, the ranking layer 130 may determine the Euclidean distance as the similarity measure, e.g., $$D(f(P), f(Q)) = \|f(P) - f(Q)\|_2^2$$

Thus, the smaller the distance D, the more fine-grained similarity there is between the images P and Q (or P and N). Conversely, the larger the distance D, the less fine-grained similarity there is between the images P and Q (or P and N).

Again, other similarity measures can be used, such as different distance type, or a similarity measurement that is not distance based. The similarity measurement used may depend on the representation that the image embedding function $f(\cdot)$ generates.

For each triplet, the process 300 determines a performance measure of the image embedding function for the image triplet based on the first and second similarity measures (312). For example, the ranking layer 130 may determine a performance measure of the image embedding function for the image triplet based on the first Euclidean distance and the second Euclidean distance. When this type of image embedding function is used, the system 100 attempts to learn an image embedding function $f(\cdot)$ that assigns a smaller distance to more similar image pairs, which can be expressed as:

$$D(f(p_i), f(p_i^+)) < D(f(p_i), f(p_i^-)),$$

$$\forall p_i, p_i^+, p_i^- \text{ such that } r(p_i, p_i^+) > r(p_i, p_i^-)$$

Where $(p_i, p_i^+, p_i^-)$ are the respective first, second and third images of a triplet. Accordingly, the performance of the image embedding function $f(\cdot)$ is proportional to the fraction of triplet orderings that agrees with the ranking of the model based on the performance measure.

The performance measure of the triplet may, in some implementations, involve determining a hinge loss based on a difference of the first Euclidean distance and the second Euclidean distance, e.g., $$l(p_i, p_i^+, p_i^-) = \max\{0, g + D(f(p_i), f(p_i^+)) - D(f(p_i), f(p_i^-))\}$$

The variable g is a gap parameter that regularizes the gap between the distance of two image pairs $(p_i, p_i^+)$ and $(p_i, p_i^-)$. The hinge loss is a convex approximation to the 0-1 ranking error loss, which measures the image function's violation of the ranking order specified in the triplet. Other types of performance measures, depending on the output of the image embedding function $f(\cdot)$, can also be used.

The process 300 adjusts the parameter weights of the image embedding function based on the performance measures for the image triplets (314). For example, an objective function of performance can be computed according to:

$$\min \sum_i \xi_i + \lambda \|W\|_2^2$$

-continued $$\text{s.t.:} \max\{0, g + D(f(p_i), f(p_i^+)) - D(f(p_i), f(p_i^-))\} \le \xi_i$$

$$\forall\ p_i, p_i^+, p_i^-\ \text{such that}\ r(p_i, p_i^+) > r(p_i, p_i^-)$$

The parameter $\lambda$ is a regularization parameter that controls the margin of the learned function to improve its generalization. W are the parameters of the embedding function $f(\bullet)$. The constraint above can be converted to an unconstrained optimization by replacing $\zeta_i = l(p_i, p_i^+, p_i^-)$.

The process 300 determines if a cessation event has occurred (316). A cessation event is an event that causes the training process to stop performing further training iterations. For example, a maximum number of training iterations being reached may be a cessation event, or satisfaction of the objective performance function described above may be a cessation event.

Example Network Architecture

In some implementations, the system of FIG. 1 can be used to train a neural network structure to learn the image embedding function $f(\bullet)$. The neural network computes the embedding of an image $p_i$: $f(p_i) \in R^d$, where d is the dimension of feature embedding.

As described above, the ranking layer 130 evaluates the embedding function's violation of the ranking order. In the case of a neural network being used to generate the embedding function, the ranking layer 130 back-propagates the gradients to lower layers of the network so that the lower layers can adjust their parameters to minimize the ranking loss.

Figure 4:
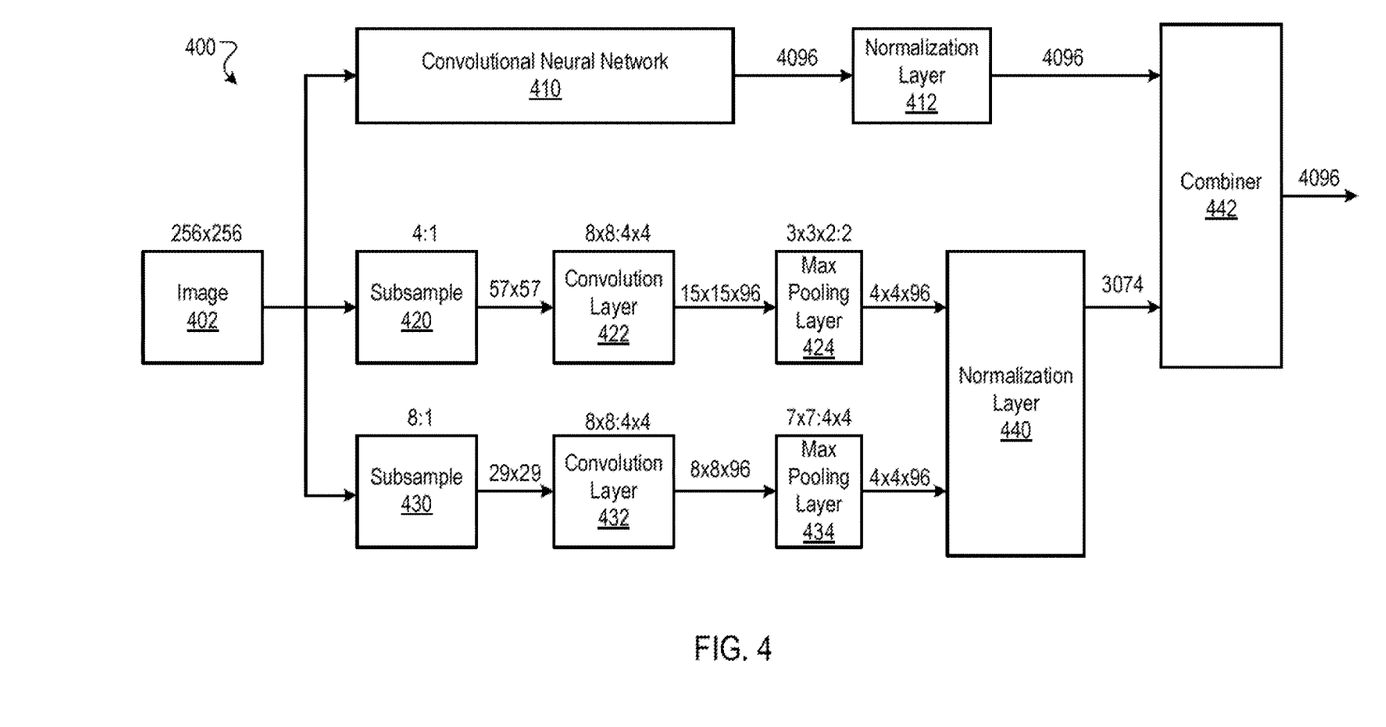
FIG. 4 is a block diagram of a network structure for learning the image embedding function.

FIG. 4 is a block diagram of a network structure 400 for learning the image embedding function. The network structure implements different levels of invariance at different scales. For example, the convolution neural network 410 may be of the ConvNet architecture that is trained to classify images into different classes, as described in the paper *Imagenet Classification With Deep Convolutional Neural Networks*, A. Krizhevsky, I. Sutskever, and G. Hinton, NIPS, pages 1106-1114 (2012). The convolution neural network 410 implements multiple convolutional layers that encode strong invariance and captures the image semantics. In particular, the convolution neural network 410 contains multiple stacked convolutional layers, max-pooling layers, local normalization layers and fully-connected layers.

In addition to the convolution neural network 410, one or more additional convolutional neural networks are also used. As shown in FIG. 4, each additional network has fewer convolution layers than the convolutional neural network 410. For example, the additional convolutional neural networks each respectively employ one convolutional layer 422 and 432.

With respect to FIG. 4, the convolutional layers 422 and 432 are implemented in two low-resolution paths that extract low resolution visual features. The numbers shown on the top of each flow arrow describe the size of the output image or feature. The numbers shown on the top of an entity box describe the size of the kernels for the corresponding layer. The numbers shown in FIG. 4 are examples only, and may vary based on the size of the original image to be processed before down sampling, and also may vary based on the kernel size. The pathways that include the two convolutional layers 422 and 432 have less invariance than the convolutional network 410 and capture the visual appearance of an image.

In the particular example of FIG. 4, the first convolutional neural network 410 has a first quantity of convolutional layers, e.g., 8, and is trained to classify images into different classes. The convolutional neural network 410 may, in some implementations, be pre-trained prior to the training of the image embedding function $f(\bullet)$. For example, the convolutional neural network 410 may be pre-trained on a dataset that is selected for the convolutional neural network 410 to learn image semantic information. The convolutional neural network 410 is configured to receive as input an image 402 at a first resolution, e.g., 256×256. Other resolutions can also be used.

Each second convolution neural network 422 and 432 constitutes a path having a second quantity of convolutional layers, e.g., one layer, and is trained to extract low-resolution features at respective second resolutions that are less than the first resolution. For example, subsamplers 420 and 430 down sample the image 402 at 4:1 and 8:1, respectively, and provide the down sampled images to the convolutional layers 422 and 432.

Each convolutional layer 422 and 432 receives the down sampled image as input, convolves it with a set of k learnable kernels, and puts through the activation function to generate k feature maps. In some implementations, the convolutional layers 422 and 432 can each be implemented as a set of local feature detectors.

The max pooling layers 424 and 434 perform max pooling over a local neighborhood around a pixel. The max pooling involves selecting a maximum of a block that is pooled. The max pooling layers 424 and 434 makes the feature maps robust to small translations.

The normalization layers 412 and 440 normalize the outputs of the convolutional neural networks to a normalized scale so that they may be combined in a combiner 442. In some implementations, the normalization layers 412 and 440 normalize the feature maps around a local neighborhood to have unit norm and zero mean. This leads to feature maps that are robust to the differences in illumination and contrast. In some implementations, the combiner 442 implements linear embedding to combine the normalized outputs.

Triplet Generation

To avoid overfitting of the function $f(\bullet)$, it is desirable to utilize a large variety of training triplets. However, the number of possible triplets increases cubically with the number of images available in a training set. It is thus computationally prohibitive to use all possible triplets for large data sets. For example, for a training dataset of 12 million images, the number of all possible triplets in the dataset is approximately $(1.2\times10^7)^3 = 1.728\times10^{21}$.

Thus, a proper subset of all possible triplets is selected for training. However, when choosing the images in a triplet, the selection process of the images should have tendency to choose a triplet such that the first image is likely more similar to the second image than it is to the third image, where the relevance score is expressed as $r_{i,j} = r(p_i, p_j)$. Thus, instead uniform sampling images for the triplets, the images are selected according to likelihoods that are based on pairwise relevance scores and pairwise relevance totals of the images. As will be described below, the pairwise relevance total for each image is generated from the pairwise relevance scores for the image relative to each other image in a set. This process is described with reference to FIG. 5, which is a flow diagram of an example process 500 for generating image triplet training data. The process 500 can be implemented in a data processing apparatus system of one or more networked computers.

The process 500 accesses images collected into respective classes (502). With respect to any particular class, e.g., a category or some other collection construct, a pair of within-class images are a pair of images that belong to the particular class, and a pair of between-class images are an image pair in which one image belongs to the particular class and the other image belongs to another class. The images collected into the classes can be provided to the system 100, or, in an alternate implementation, can be generated as described in the next section.

The following steps 504-510 are done for each class, however, in the description that follows, the processing and generation of image triplets for only one class is described.

The process 500 determines, for a class, pairwise relevance totals of images belonging to the class (504). For example, for a set of images P that belong to a class c, the pairwise relevance scores $r_{i,j}=r(p_i, p_j)$ can be determined. Let the total relevance score, which is the pairwise relevance total, for the $i^{th}$ image be:

$$r_i = \sum_{j:c_j=c_i, j\neq i} r_{i,j}$$

The pairwise relevance total of an image $p_i$ reflects how relevant the image is in terms of its relevance to the other images in the same category.

The process 500 selects an image in the class of images as a first image in the image triplet according to a likelihood that is proportional to its pairwise relevance total (506). In particular, to generate a triplet, the system 100 first samples a first image, or query image, $p_i$ from P according to its pairwise relevance total $r_i$. The likelihood of an image being chosen as a query image is thus proportional to its total relevance score.

The process 500 selects another image in the class of images as a second image in the image triplet according to a likelihood based on a selection threshold and a pairwise relevance score that measures a similarity of the first image to the second image (508). The images that are selected for the second image, also known as the positive image, are selected from the same category from which the first image was selected. Because it is desirable to have a relatively high relevance measure for the first and second image of a triplet when compared to a relevance measure of the first and third image of the triplet, the system 100 should be biased to samples the second images $p_i^+$ from images with high relevance scores $r_{i,i+}$. Thus, the system determines a likelihood of choosing a given image as the second image $p_i^+$ according to the following probability:

$$P(p_i^+) = \frac{\min\{T_p, r_{i,i+}\}}{Z_i}$$

The value $T_p$ is a threshold parameter for a minimum likelihood, and $Z_i$ is a normalization constant that is equal to $\Sigma_{i+} P(p_i^+)$ for all the $p_i^+$ in the same category as the first image $p_i$.

In some implementations, the third image, also known as a negative image, may be selected from either an in-class image or from an out-of-class image. The choice between selecting an in-class image or an out-of-class image may be made randomly, or may be made according to an in-class/out-of-class target ratio.

For an in-class selection, the process 500 selects another image in the class of images as a third image in the image triplet according to a likelihood based on the section threshold and the pairwise relevance score that measures a similarity of the first image to the third image (510A). Because it is desirable to have a relatively low relevance measure for the first and third image of a triplet when compared to a relevance measure of the first and second image of a triplet, the system 100 should be biased to samples of the second images $p_i^-$ from image with low relevance scores $r_{i,i-}$. In some implementations, in-class images are drawn for the third image with the same distribution described above with reference to the second image of the triplet.

For out-of-class selections, the process 500 selects another image in another class as a third image in the image triplet (510B). In some implementations, the out-of-class images are drawing uniformly from all the images that belong to a different class from the first image $p_i$.

In some implementations, the system 100 can require that for each image triplet, the first, second and third images are selected such that the difference resulting from subtracting the second pairwise relevance score from the first pairwise relevance score meets or exceeds a threshold difference $T_r$, e.g., $$r_{i,i+} - r_{i,i-} \geq T_r, \forall t_i = (p_i, p_i^+, p_i^-)$$

Triplets that do not meet this criterion are rejected.

A variety of pairwise relevance functions r(•) can be used to realize the pairwise relevance scores. In some implementations, the function r(•) is constrained to be 0 for between-class image pairs. For in-class pairs, the function r(•), in some implementations, may include a weighted linear combination of multiple features, such as histogram object gradients (HOG) features, scale invariant feature transforms (SIFT), Laplacian of Gaussian (LoG) blob detection, and the like. Furthermore, if image annotation data are available, the function r(•) may also use features derived from the image annotations. The linear weights may be learned through max-margin linear weight learning using human rated data. Thus, in some implementations, the function r(•) accounts for both visual appearance information and semantic information. However, the function r(•) may be expensive to compute, and thus modeling the image embedding function ƒ(•), which is less expensive to compute, results in resource savings.

Other pairwise relevance functions can also be used, and the pairwise relevance function need not be constrained to be 0 for between-class image pairs.

Selection of Training Images

In implementations that utilize the network structure 400 of FIG. 4, the system 100 uses two collections of training data to train the image embedding function ƒ(•). The first, as described above, is a dataset that is selected for the convolutional neural network 410 to learn image semantic information. For example, the data set may contain N images in M categories, where N and M are on the order of 1,000. On example training set is the ImageNet ILSVRC-2012 dataset. Other training sets can also be used.

The second training data set is relevance training data, which is used for learning fine-grained visual similarity. In some implementations, the images are collected in a bootstrapping fashion, as described with reference to FIG. 6, which is a flow diagram of an example process 600 for generating collections of images for multiple classes. The process 600 can be implemented in a data processing apparatus system of one or more networked computers.

Figure 6:
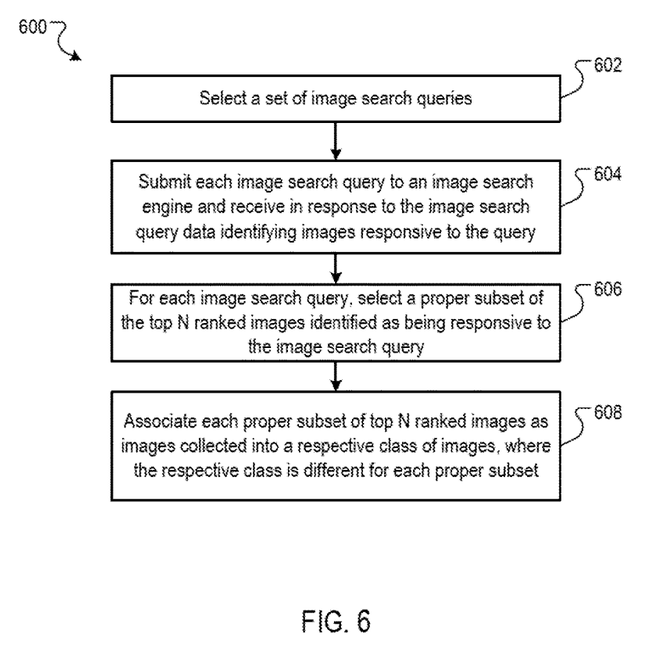
FIG. 6 is a flow diagram of an example process for generating collections of images for multiple classes.

The process 600 selects a set of image search queries (602). For example, the triplet selection layer 110 may communicate with a search system 108 and select a set of popular queries. The popular quires may be filtered to ensure class diversity. For example, queries such as "Lions" and "Lion images" may be collapsed into the canonical query "Lions." The filtering can be implemented using appropriate processes that measure query similarity and query equivalence. Alternatively, the triplet selection layer 110 may have been provided a set of queries from an administrator that specified the set of queries.

The process 600 submits each image search query to an image search engine and receives in response to the image search query data identifying images responsive to the query (604). For example, the triplet selection layer 110 provides each query to the search system 108 and receives from the search system image search results for each query. The search results are ranked according to an order that is indicative of the relevance of the corresponding image to the query.

The process 600, for each image search query, selects a proper subset of the top N ranked images identified as being responsive to the image search query (606). For example, for each query, the top N images in the rank order are selected. The value of N is selected to ensure that there may be a diverse set of triplets selected. For example, N may be in the range of 100 to 200.

The process 600 associates each proper subset of top N ranked images as images collected into a respective class of images, where the respective class is different for each proper subset (608). Each class may correspond to the query for which the images were identified.

The images and their associations with classes are then stored as the training images 102. The system 100 may then utilize the process 500 of FIG. 5 to generate the training triplets.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network.

The computing system can include users and servers. A user and server are generally remote from each other and typically interact through a communication network. The relationship of user and server arises by virtue of computer programs running on the respective computers and having a user-server relationship to each other.

While this specification contains many specific implementation details, these should not be construed as limitations on the scope of what may be claimed. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:
    iteratively training an image embedding function on image triplets, the embedding function comprising a set of parameter weights that operate on an input image to produce as output a representation of features of the image, each iteration of the training comprising:
        selecting image triplets, each image triplet being a combination of a first image, a second image and a third image, wherein a first pairwise relevance score that measures a similarity of the first image to the second image is greater than a second pairwise relevance score that measures the similarity of the first image to the third image;
        for each image triplet:
            providing each of the first, second and third images as input to the image embedding function,
            generating, by the image embedding function, a first representation of the features of the first image, a second representation of the features of the second image, and a third representation of the features of the third image;
            determining, based on the first representation of features and the second representation of features, a first similarity measure that measures a similarity of the first image to the second image;
            determining, based on the first representation of features and the third representation of features, a second similarity measure that measures a similarity of the first image to the third image;
            determining, based on the first and second similarity measures, a performance measure of the image embedding function for the image triplet;
        adjusting the parameter weights of the image embedding function based on the performance measures for the image triplets; and
        performing another iteration of the training until a cessation event occurs.

2. The computer-implemented method of claim 1, wherein:
    determining the first similarity measure that measures the similarity of the first image to the second image comprises determining a first distance measure from the first representation of the features of the first image and the second representation of features of the second image; and
    determining the second similarity measure that measures the similarity of the first image to the third image comprises determining a second distance measure from the first representation of the features of the first image and the second representation of the features of the second image.

3. The computer-implemented method of claim 1, wherein the image embedding function generates a mapping of the image in Euclidean space as the output representation of features;
    wherein determining the first similarity measure that measures the similarity of the first image to the second image comprises determining a first Euclidean distance between the first representation of the features of the first image and the second representation of features of the second image; and
    wherein determining the second similarity measure that measures the similarity of the first image to the third image comprises determining a second Euclidean distance between the first representation of the features of the first image and the third representation of features of the third image.

4. The computer-implemented method of claim 3, wherein determining a performance measure of the image embedding function for the image triplet comprises determining the performance measure based on the first Euclidean distance and the second Euclidean distance.

5. The computer-implemented method of claim 4, wherein determining the performance measure based on the first Euclidean distance and the second Euclidean distance comprises determining a hinge loss based on a difference of the first Euclidean distance and the second Euclidean distance.

6. The computer-implemented method of claim 5, further comprising:
    summing the hinge losses for the image triplets,
    determining whether the summation of the hinge losses meets a minimization criterion; and
    determining the cessation event occurs when the summation of the hinge losses meets the minimization criterion.

7. The computer-implemented method of claim 1, wherein the image embedding function comprises;
    a first convolutional neural network having a first quantity of convolutional layers and trained to classify a plurality of images into a plurality of different classes, and configured to receive as input an image at a first resolution;
    a second convolution neural network having a second quantity of convolutional layers and trained to extract low-resolution features of a second resolution that is less than the first resolution, and configured to receive as input an image at the second resolution, wherein the second quantity of convolutional layers is less than the first quantity of convolutional layers; and
    wherein generating by the image embedding function a representation of the features of the image comprises:

providing the image to the first convolution neural network at the first resolution;
down sampling the image to the second resolution to generate a down sampled image; and
providing the down sampled image to the second convolutional neural network.

8. The computer-implemented method of claim 7, wherein the image embedding function further comprises:
a first normalization layer that normalizes the output of the first convolutional neural network;
a second normalization layer that normalizes the output of the second convolutional neural network; and
a linear embedding layer that combines the normalized outputs of the first convolutional neural network and the second convolutional neural network.

9. The computer-implemented method of claim 1, further comprising:
accessing a plurality of images, the images collected into respective classes of images; and
for at least a class of images of the respective classes of images:
determining, for each image, a pairwise relevance total that is based on pairwise relevance scores that respectively measure the similarity of the image to a respective other image in the class of images;
selecting an image in the class of images as a first image in the image triplet according to a likelihood that is proportional to its pairwise relevance total;
selecting another image in the class of images as a second image in the image triplet according to a likelihood based on a selection threshold and a pairwise relevance score that measures a similarity of the first image to the second image; and
selecting another image in the class of images as a third image in the image triplet according to a likelihood based on the section threshold and the pairwise relevance score that measures a similarity of the first image to the third image.

10. The computer-implemented method of claim 9, wherein selecting another image in the class of images as the second image in the image triplet comprises selecting another image in the class of images based on a minimum of the selection threshold and the pairwise relevance score; and
wherein selecting another image in the class of images as the third image in the image triplet comprises selecting another image in the class of images based on a minimum of the selection threshold and the pairwise relevance score.

11. The computer-implemented method of claim 9, further comprising:
for at least one image triplet, selecting an image in another class of images of the respective classes of images as a third image in the image triplet.

12. The computer-implemented method of claim 9, wherein, for each image triplet, the first, second and third images are selected such that the difference resulting from subtracting the second pairwise relevance score from the first pairwise relevance score meets or exceeds a threshold difference.

13. The computer-implemented method of claim 9, wherein accessing a plurality of images, the images collected into respective classes of images comprises:
selecting a set of image search queries;
submitting each image search query to an image search engine and receiving in response to the image search query data identifying images responsive to the query, the images ranked according to an order;
for each image search query, selecting a proper subset of the top N ranked images identified as being responsive to the image search query; and
associating each proper subset of top N ranked images as images collected into a respective class of images, where the respective class is different for each proper subset.

14. The computer-implemented method of claim 9, wherein determining a pairwise relevance total comprises determining a pairwise relevance score based on a comparison of histogram object gradients (HOG) features and scale invariant feature transforms (SIFT).

15. A non-transitory computer storage medium encoded with a computer program, the program comprising instructions that when executed by data processing apparatus cause the data processing apparatus to perform operations comprising:
iteratively training an image embedding function on image triplets, the embedding function comprising a set of parameter weights that operate on an input image to produce as output a representation of features of the image, each iteration of the training comprising:
selecting image triplets, each image triplet being a combination of a first image, a second image and a third image, wherein a first pairwise relevance score that measures a similarity of the first image to the second image is greater than a second pairwise relevance score that measures the similarity of the first image to the third image;
for each image triplet:
providing each of the first, second and third images as input to the image embedding function;
generating, by the image embedding function, a first representation of the features of the first image, a second representation of the features of the second image, and a third representation of the features of the third image;
determining, based on the first representation of features and the second representation of features, a first similarity measure that measures a similarity of the first image to the second image;
determining, based on the first representation of features and the third representation of features, a second similarity measure that measures a similarity of the first image to the third image;
determining, based on the first and second similarity measures, a performance measure of the image embedding function for the image triplet;
adjusting the parameter weights of the image embedding function based on the performance measures for the image triplets; and
performing another iteration of the training until a cessation event occurs.

16. A system, comprising:
a data processing apparatus; and
a computer storage medium encoded with a computer program, the program comprising instructions that when executed by the data processing apparatus cause the data processing apparatus to perform operations comprising:
iteratively training an image embedding function on image triplets, the embedding function comprising a set of parameter weights that operate on an input image to produce as output a representation of features of the image, each iteration of the training comprising:

selecting image triplets, each image triplet being a combination of a first image, a second image and a third image, wherein a first pairwise relevance score that measures a similarity of the first image to the second image is greater than a second pairwise relevance score that measures the similarity of the first image to the third image;

for each image triplet:
provic each of the first, second and third images as input to the image embedding function;
generating, by the image embedding function, a first representation of the features of the first image, a second representation of the features of the second image, and a third representation of the features of the third image;
determining, based on the first representation of features and the second representation of features, a first similarity measure that measures a similarity of the first image to the second image;
determining, based on the first representation of features and the third representation of features, a second similarity measure that measures a similarity of the first image to the third image;
determining, based on the first and second similarity measures, a performance measure of the image embedding function for the image triplet;
adjusting the parameter weights of the image embedding function based on the performance measures for the image triplets; and
performing another iteration of the training until a cessation event occurs.

17. The system of claim 16, wherein the image embedding function generates a mapping of the image in Euclidean space as the output representation of features;
wherein determining the first similarity measure that measures the similarity of the first image to the second image comprises determining a first Euclidean distance between the first representation of the features of the first image and the second representation of features of the second image; and
wherein determining the second similarity measure that measures the similarity of the first image to the third image comprises determining a second Euclidean distance between the first representation of the features of the first image and the third representation of features of the third image.

18. The system of claim 17, wherein determining a performance measure of the image embedding function for the image triplet comprises determining the performance measure based on the first Euclidean distance and the second Euclidean distance.

19. The system of claim 16, wherein the image embedding function comprises:
a first convolutional neural network having a first quantity of convolutional layers and trained to classify a plurality of images into a plurality of different classes, and configured to receive as input an image at a first resolution;
a second convolution neural network having a second quantity of convolutional layers and trained to extract low-resolution features of a second resolution that is less than the first resolution, and configured to receive as input an image at the second resolution, wherein the second quantity of convolutional layers is less than the first quantity of convolutional layers; and
wherein generating by the image embedding function a representation of the features of the image comprises:
providing the image to the first convolution neural network at the first resolution;
down sampling the image to the second resolution to generate a down sampled image; and
providing the down sampled image to the second convolutional neural network.

20. The system of claim 16, the operations further comprising:
accessing a plurality of images, the images collected into respective classes of images; and
for at least a class of images of the respective classes of images:
determining, for each image, a pairwise relevance total that is based on pairwise relevance scores that respectively measure the similarity of the image to a respective other image in the class of images;
selecting an image in the class of images as a first image in the image triplet according to a likelihood that is proportional to its pairwise relevance total;
selecting another image in the class of images as a second image in the image triplet according to a likelihood based on a selection threshold and a pairwise relevance score that measures a similarity of the first image to the second image; and selecting another image in the class of images as a third image in the image triplet according to a likelihood based on the section threshold and the pairwise relevance score that measures a similarity of the first image to the third image.

* * * * *